(12) United States Patent
Griffin et al.

(10) Patent No.: US 12,717,588 B2
(45) Date of Patent: Aug. 25, 2026

(54) AUTOMATED GENERATION AND EXECUTION OF CONFIGURATION PLAYBOOKS FROM SPECIFICATION FILES IN DISTRIBUTED SYSTEMS

(71) Applicant: Red Hat, Inc., Raleigh, NC (US)

(72) Inventors: Leigh Griffin, Waterford (IE); Dmitri Saridakis, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 234 days.

(21) Appl. No.: 18/587,029

(22) Filed: Feb. 26, 2024

(65) Prior Publication Data

US 2025/0272110 A1 Aug. 28, 2025

(51) Int. Cl.

| | |
|---|---|
| ***G06F 9/445*** | (2018.01) |
| ***G06F 8/10*** | (2018.01) |
| ***G06F 8/41*** | (2018.01) |

(52) U.S. Cl.

CPC ................ *G06F 9/445* (2013.01); *G06F 8/10* (2013.01); *G06F 8/41* (2013.01)

(58) Field of Classification Search

CPC ............... G06F 8/10; G06F 8/41; G06F 9/445

See application file for complete search history.

(56) References Cited

U.S. PATENT DOCUMENTS

| | | | | |
|---|---|---|---|---|
| 10,922,357 | B1 * | 2/2021 | Chennuru | G06F 16/2457 |
| 11,537,400 | B1 * | 12/2022 | Zhang | G06F 8/53 |
| 2012/0254876 | A1 * | 10/2012 | Bishop | G06F 9/546 718/102 |
| 2015/0026658 | A1 * | 1/2015 | Jones | G06F 9/4488 717/108 |
| 2019/0339947 | A1 * | 11/2019 | McCune | G06F 8/34 |
| 2025/0208929 | A1 * | 6/2025 | Hursh | G06F 9/541 |

* cited by examiner

*Primary Examiner* — Raymond N Phan

(74) *Attorney, Agent, or Firm* — Kilpatrick Townsend & Stockton LLP

(57) ABSTRACT

Some examples of the present disclosure relate to executing configuration files generated from specification files. In one particular example, a system can receive a specification file defining functions for an application programming interface (API) associated with a software entity. The system can generate a graph identifying keywords and relationships associated with the functions. The system can generate, based on the graph, a mapping dictionary that maps the functions to tasks usable in an executable file associated with the API. The system can generate the executable file including one or more of the tasks based on the mapping dictionary and execute the executable file to perform operations associated with the API and the software entity at a node.

17 Claims, 3 Drawing Sheets

FIG. 3

AUTOMATED GENERATION AND EXECUTION OF CONFIGURATION PLAYBOOKS FROM SPECIFICATION FILES IN DISTRIBUTED SYSTEMS

TECHNICAL FIELD

The present disclosure relates generally to software deployment. More specifically, but not by way of limitation, this disclosure relates to executing configuration files generated from specification files.

BACKGROUND

Distributed computing environments such as cloud computing environments and computing clusters have recently grown in popularity. These computing environments can include large numbers of nodes (e.g., physical or virtual machines) for use in performing various computing tasks. Given the complexity of some distributed computing environments, automation frameworks have been developed that help manage them more efficiently. These automation frameworks can help to automate the deployment, configuration, and management of various aspects of a distributed computing environment.

One popular automation framework is Ansible by Red Hat®. Ansible is a software tool that can assist with deploying applications, updating workstations and servers, cloud provisioning, configuration management, and many other functions for systems administrators. In Ansible, there are two categories of computers: control nodes and managed nodes. A control node generally runs Ansible and manages the managed nodes. A managed node can be any computing device that is managed by the control node. The control node can transmit small software programs called "modules" to the managed nodes, which can run the modules. When executed, the modules can configure the managed nodes to conform to a target state. Once they finish executing, the modules can be removed from the managed nodes. In this way, the modules can be temporarily stored on the managed nodes for the duration of time in which they execute and then removed.

In Ansible, the modules provide a means to accomplish a desired automation task, but the way in which the modules are used is governed by a "playbook." A playbook is a configuration file drafted in a human-readable language that provides instructions for what needs to be done to transform a managed node into a target state. Playbooks are typically written in a YAML Ain't Markup Language (YAML) format, though other formats are possible.

BRIEF DESCRIPTION OF THE DRAWINGS

FIG. 3 is a flow chart of an example of a process for executing playbooks generated from specification files according to some examples of the present disclosure.

DETAILED DESCRIPTION

Figure 1:
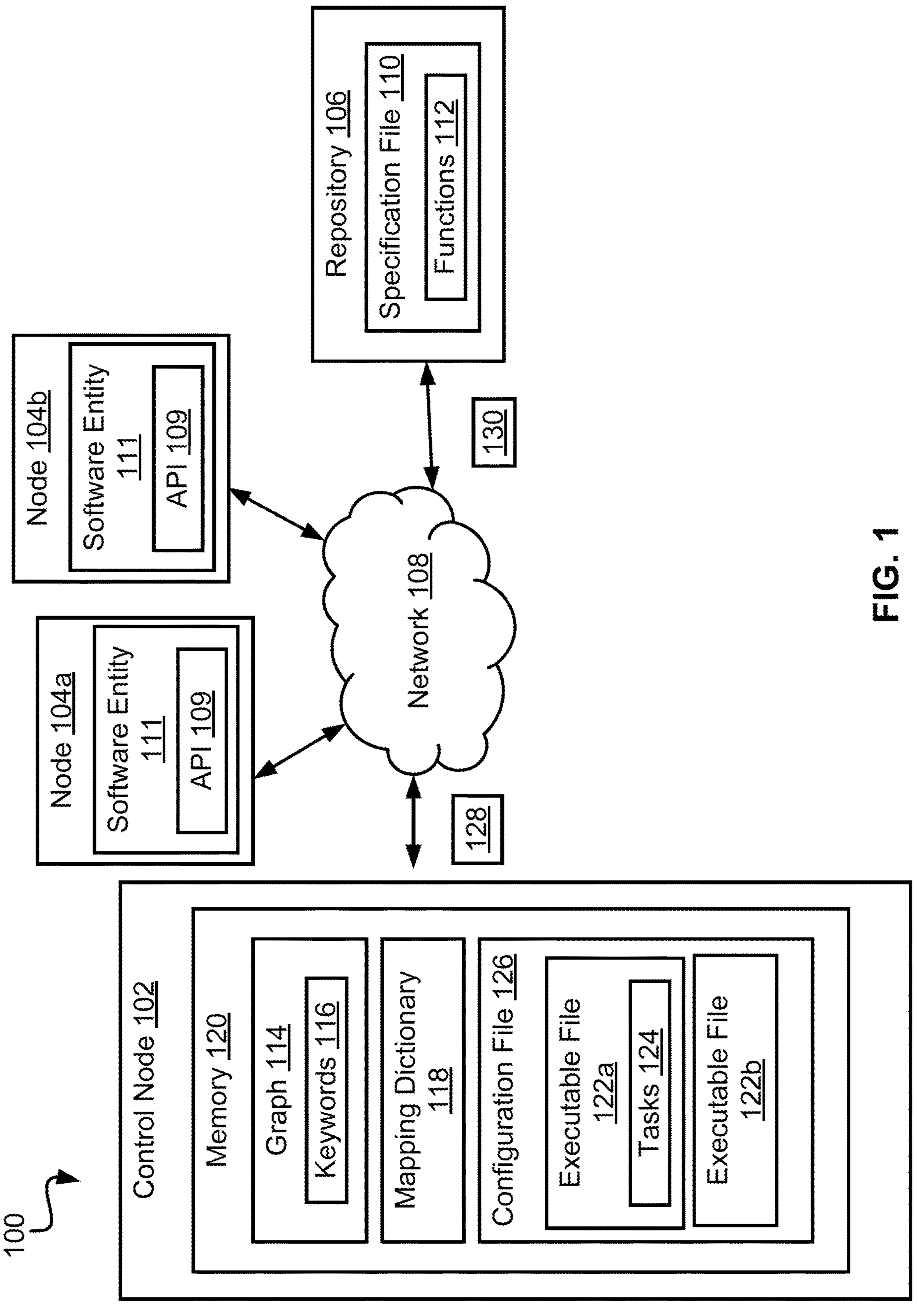
FIG. 1 is a block diagram of an example of a system for executing playbooks generated from specification files according to some examples of the present disclosure.

Some automation frameworks (e.g., Ansible) involve a control node and one or more managed nodes. The control node can manage the managed nodes by configuring them so that they conform to a target state. This configuration process may involve the control node transmitting, based on a configuration file, commands or modules to the managed nodes for installing operating systems, applications, and other software on the managed nodes and configuring the settings thereof. Current automation frameworks may require a system administrator to manually provide executable files, such as Ansible modules and playbooks, for use by the control node in managing the managed nodes. Automation frameworks are important in environments in which device capability is not uniform, such as in edge computing or automotive domains, or environments in which there is significant user involvement in adding features and services. To use an automation framework, an executable file is typically manually generated for each piece of functionality of a software entity. So, the generation of the executable files can be time consuming and error prone. In addition, some devices may not be capable of supporting all functionality of a software entity or associated application programming interfaces (APIs), leading to increased errors and suboptimal execution of the executable files.

Some examples of the present disclosure can overcome one or more of the abovementioned problems by providing a system that can automatically generate an executable file for an API and associated software entity for a node. The system can receive a specification file defining functions for an API associated with a software entity. The system can generate a graph identifying keywords and relationships associated with the functions. The system can then generate, based on the graph, a mapping dictionary that maps the functions to tasks usable in an executable file associated with the API. The system can generate the executable file including one or more of the tasks based on the mapping dictionary and execute the executable file to perform operations associated with the API and the software entity at a node. Since the generation of the executable file is performed automatically and without manual input, the executable file may have fewer errors than conventionally-developed executable files, resulting in improved execution of the executable file. In addition, the system may combine multiple executable files into a configuration file that can then be executed to deploy the software entity and perform operations associated with the API at the node. The executable files can be selected based on a capability of the node or a selection of desired functionality for the node. In this way, the configuration files can be customized based on the node to minimize errors during execution.

As a particular example, a user may want to deploy a software entity at one or more nodes using an automation framework (e.g., Ansible). To do so, a system may detect that a new Open API specification file for an API associated with the software entity is uploaded to a repository. The OpenAPI specification can define functions (e.g., POST, get, put, delete, etc.) for the API. The system may then receive the OpenAPI specification file and generate an abstract syntax tree of keywords included in the OpenAPI specification file. The system can iterate through the abstract syntax tree to generate a mapping dictionary that associates the keywords of the functions to tasks that can be included in an Ansible module. From the mapping dictionary, for each function defined in the OpenAPI specification, the system can generate an Ansible module that includes at least one task. Once the Ansible module is generated, the system can execute the Ansible module by deploying the Ansible module at the nodes or performing other suitable actions based on the tasks included in the Ansible module. In addition, the system may generate an Ansible playbook that includes multiple Ansible modules. The system can execute the Ansible playbook by deploying the Ansible playbook at the nodes or performing other suitable actions based on the tasks included in the Ansible playbook.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a system 100 for executing playbooks generated from specification files according to some examples of the present disclosure. In some examples, the system 100 may be a distributed computing environment such as an edge computing environment, a cloud computing environment, or a computing cluster. The system 100 can be formed from one or more nodes (e.g., physical or virtual servers) that are in communication with one another via a network 108, such as a local area network (LAN), wide area network (WAN), the Internet, or any combination thereof.

The system 100 can include a control node 102 that can manage or otherwise communicate with nodes 104*a*-104*b*. The control node 102 can establish a network connection, such as via the network 108, with each of the nodes 104*a*-104*b* through which the control node 102 can manage the nodes 104*a*-104*b*. Examples of the control node 102 or of the nodes 104*a*-104*b* can include desktop computers, laptop computers, servers, mobile phones, tablets, etc.

The control node 102 can control deployment of instances of a software entity 111 (e.g., container or software application) on the nodes 104*a*-104*b* using a configuration management system such as Ansible by Red Hat®. For example, the control node 102 can use a configuration file 1126 (e.g., an Ansible playbook) to automate deployment of the software entity 111. The configuration file 126 can include a set of executable files 122*a*-122*b* (e.g., Ansible modules) that each include one or more tasks 124 that the control node 102 can execute to deploy the software entity 111 to the nodes 104*a*-104*b* or to containers or virtual machines executing on the nodes 104*a*-104*b*. The configuration file 126 can also be executed to deploy updates and configure networking, security, user management, and cloud management for the system 100.

In some examples, to generate the executable files 122*a*-122*b*, the control node 102 can receive a specification file 110 that defines functions 112 for an API 109 associated with the software entity 111. The specification file 110 may be an OpenAPI Specification. The specification file 110 can be stored in a repository 106, so the control node 102 can access the specification file 110 from the repository 106. The control node 102 may monitor the repository 106 to determine when a new specification file is stored in the repository 106 or when an update is made to a specification file 110 in the repository 106. The control node 102 may retrieve the specification file 110 by loading the specification file 110 in a memory 120 (e.g., Random-Access Memory (RAM)).

Once the control node 102 receives the specification file 110, the control node 102 can generate a graph 114 that identifies keywords 116 associated with the functions 112 defined in the specification file 110. The keywords 116 can be paths, conditions, variable names, and other values defined in the specification file 110. The graph 114 may be an abstract syntax tree (AST) or any other suitable graph structure that identifies the keywords 116 and relationships (e.g., dependencies) between the keywords 116. Once generated, the graph 114 can be parsed such that each of the functions 112 of the specification file 110 can be determined.

From the graph 114, the control node 102 can generate a mapping dictionary 118 that maps the functions 112 to tasks 124 that are usable in the executable file 122*a* associated with the API 109. The control node 102 can iterate through the graph 114 to generate the mapping dictionary 118. For example, the control node may map a function associated with a keyword of a POST path in the graph 114 to a create( ) method for the corresponding task in the executable file 122*a*. The mapping dictionary 118 can indicate that the POST path is mapped to the create( ) method. Each path, or function, can be mapped to a task, which can be included in an executable file.

In some examples, the control node 102 can generate the executable files 122*a*-122*b* from the mapping dictionary 118. For instance, the control node 102 may export the mapping dictionary 118 as a directory structure for a plugin (e.g., an Ansible plugin) that can generate the executable files 122*a*-122*b* from the mapping dictionary 118. Each of the executable files 122*a*-122*b* can include one or more tasks 124 that correspond to the functions 112 in the specification file 110. Once an executable file is generated, the control node 102 can execute the executable file to perform operations associated with the API 109 and the software entity 111 at a node. For example, once the executable file 122*a* is generated, the control node 102 may execute the executable file 122*a* to perform operations associated with the API 109 at the node 104*a*. The operations may involve configuring the API 109 to provide a particular response to a particular call or instructing the node 104*a* on how to make a call to the API 109. In addition, the control node 102 may execute the executable file 122*a* to deploy the software entity 111 to the node 104*a*.

In some examples, rather than executing a single executable file, the control node 102 may generate the configuration file 126 that includes multiple executable files. As illustrated in FIG. 1, the configuration file 126 includes the executable files 122*a*-122*b*. The configuration file 126 can include all of the tasks that are to be performed at a node for the API 109. Once the configuration file 126 with each of the executable files 122*a*-122*b* is generated, the control node 102 can execute the configuration file 126 to perform the operations associated with the API 109 and the software entity 111 at a node.

In some examples, the control node 102 may receive an input 128 indicating a subset of the functions 112 for inclusion in the configuration file 126. The input 128 may be received from the node 104*a* or another device in the system 100. In this way, the input 128 may indicate a custom set of functions of the API 109 that are to be performed at the node 104*a*, where some of the functions 112 may be excluded. Upon receiving the input 128, the control node 102 can generate executable files corresponding to the functions 112 using the mapping dictionary 118 and then select a subset of the executable files that correspond to the subset of the functions 112. As an example, the specification file 110 may include five functions, and the input 128 can indicate three of the functions that are to be included in the configuration file 126. So, from the five executable files that are generated, the control node 102 can select the three executable files that correspond to the three functions for inclusion and generate the configuration file 126 to include these three executable files while excluding the other two executable files. Alternatively, the control node 102 may only generate executable files for the selected functions without generating the executable files for the other functions. The control node 102 can then execute the configuration file 126 to perform the operations associated with the API 109 and the software entity 111 at the node 104*a*.

The input 128 may additionally or alternatively indicate a set of capability parameters of a node. For instance, the capability parameters may include a central processing unit (CPU) capacity, a random access memory (RAM) capacity, a load on the node, etc. The input 128 may be received as metadata included in a request for implementing the API 109 at a node. Upon receiving the input 128, the control node 102 can generate executable files corresponding to the functions 112 using the mapping dictionary 118 and then select a subset of the executable files based on the capability parameters. Some tasks or functions may use more CPU or RAM than other tasks or functions. The usage by the functions may be indicated in the specification file 110. So, by determining the capability parameters, the configuration file 126 can be customized for the capability of a given node. So, if the node 104*a* has a greater CPU capacity than the node 104*b*, the control node 102 may generate a first configuration file for the node 104*a* that includes more executable files than a configuration file that is generated for the node 104*b*. Once the configuration file 126 is generated based on capability parameters, the control node 102 can execute the configuration file 126 to perform the operations associated with the API 109 and the software entity 111 at the node.

In some examples, the control node 102 may detect an update 130 to the specification file 110. The update 130 may involve an addition of one or more functions, a removal of one or more of the functions 112, a change to one or more of the functions 112, or a combination thereof. Upon detecting the update 130, the control node 102 can update the graph 114 and the mapping dictionary 118 accordingly. In addition, based on the updated mapping dictionary, the control node 102 can generate an updated executable file that can then be executed to perform the operations associated with the API 109 and the software entity 111 at a node. If the update 130 includes an addition or removal of a function, the control node 102 can generate an updated configuration file by adding executable files associated with the update 130 to the configuration file 126, or by removing executable files associated with the update 130 from the configuration file 126. So, if the executable file 122*b* corresponds to a function that is removed from the specification file 110 during the update 130, the control node 102 can then remove the executable file 122*b* from the configuration file 126.

In some embodiments, the executable files 122*a*-122*b* can be generated in association with a programming language that is supported by the node at which the executable files 122*a*-122*b* are to be executed. For instance, the node 104*a* may support Python, so the executable files 122*a*-122*b* that are to be executed at the node 104*a* can be generated in Python. Alternatively, the node 104*b* may support Java, so the executable files 122*a*-112*b* that are to be executed at the node 104*b* can be generated in Java. Additionally or alternatively, a node may support multiple programming languages. So, the control node 102 can generate the executable file 122*a* for the tasks 124 in a first programming language, and can generate the executable file 122*b* for the same tasks in a second programming language. The executable files 122*a*-122*b* can then be included in the configuration file 126 for execution.

In some examples, in response to executing the executable file 122*a* at the node 104*a*, the control node 102 may determine that the execution encounters an error. For instance, the error may be a runtime error, an incorrect response, or any other error. Upon detecting the error, the control node 102 may update the specification file 110 to indicate the error that occurs for the executable file 122*a* at the node 104*a*. The control node 102 may add or update metadata of the specification file 110 to indicate the error. So, when a similar node requests to use the API 109 or to deploy the software entity 111, the control node 102 may exclude the executable file 122*a* from a configuration file generated for the node to avoid the error.

While FIG. 1 depicts a specific arrangement of components, other examples can include more components, fewer components, different components, or a different arrangement of the components shown in FIG. 1. For instance, in other examples, the configuration file 126 can include more than two executable files. Additionally, a different number of instances of an API may be installed on a different number of nodes. Also, any component or combination of components depicted in FIG. 1 can be used to implement the process(es) described herein. Ansible is one example of an Infrastructure as Code (IaC) application, but aspects of the present disclosure are not limited to Ansible. Other IaC applications may be used, such as Terraform, Chef, and the like.

Figure 2:
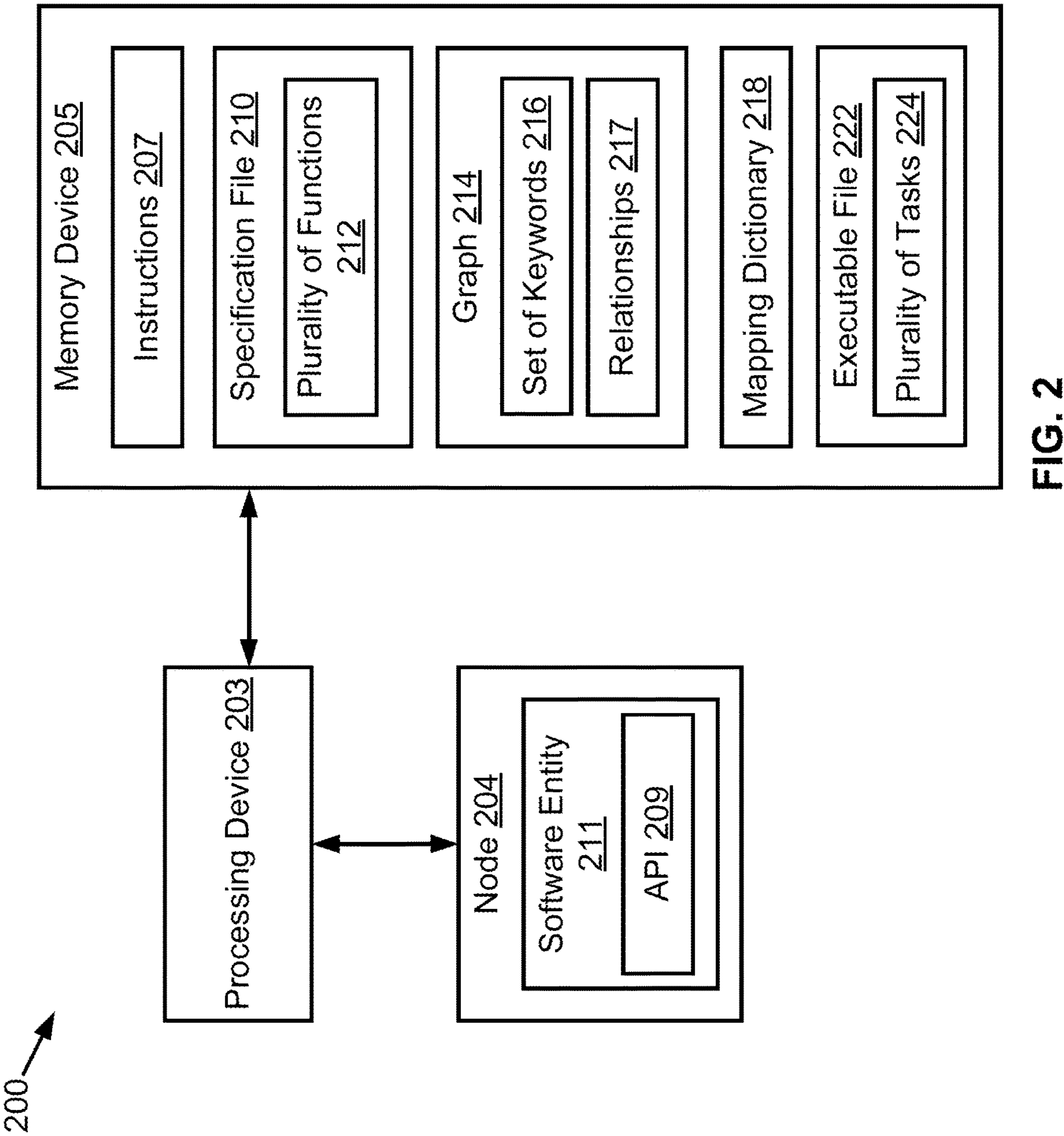
FIG. 2 is a block diagram of an example of a computing environment for executing playbooks generated from specification files according to some examples of the present disclosure.

FIG. 2 is a block diagram of an example of a computing environment for executing playbooks generated from specification files according to some examples of the present disclosure. The computing environment 200 includes a processing device 203 communicatively coupled to a memory device 205. In some examples, the components of the computing environment 200, such as the processing device 203 and the memory device 205, may be part of a same computing device, such as the control node 102 in FIG. 1. In other examples, the processing device 203 and the memory device 205 can be included in separate computing devices that are communicatively coupled.

The processing device 203 can include one processing device or multiple processing devices. Non-limiting examples of the processing device 203 can include a Field-Programmable Gate Array (FPGA), an application-specific integrated circuit (ASIC), and a microprocessor. The processing device 203 can execute instructions 207 stored in the memory device 205 to perform computing operations. In some examples, the instructions 207 can include processor-specific instructions generated by a compiler or an interpreter from code written in any suitable computer-programming language, such as C, C++, C #, etc.

The memory device 205 can include one memory or multiple memories. The memory device 205 can be non-volatile and may include any type of memory that retains stored information when powered off. Non-limiting examples of the memory device 205 include electrically erasable and programmable read-only memory (EEPROM), flash memory, or any other type of non-volatile memory. At least some of the memory device 205 can include a non-transitory computer-readable medium from which the processing device 203 can read instructions 207. A computer-readable medium can include electronic, optical, magnetic, or other storage devices capable of providing the processing device 203 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 207.

In some examples, the processing device 203 can execute the instructions 207 to perform some or all of the functionality described herein. For example, the processing device 203 can receive a specification file 210 defining a plurality of functions 212 for an API 209 associated with a software entity 211. The processing device 203 can generate a graph 214 identifying a set of keywords 216 associated with the plurality of functions 212. In addition, the graph 214 can indicate relationships 217 between keywords of the set of keywords 216. For instance, a line from a first keywords to a second keyword can indicate that the second keyword depends on the first keyword. The processing device 203 can generate, based on the graph 214, a mapping dictionary 218 that maps the plurality of functions 212 to a plurality of tasks 224 usable in an executable file 222 associated with the API 209. The processing device 203 can then generate the executable file 222 including one or more of the plurality of tasks 224 based on the mapping dictionary 218 and execute the executable file 222 to perform operations associated with the API 209 and the software entity 211 at a node 204.

Figure 3:
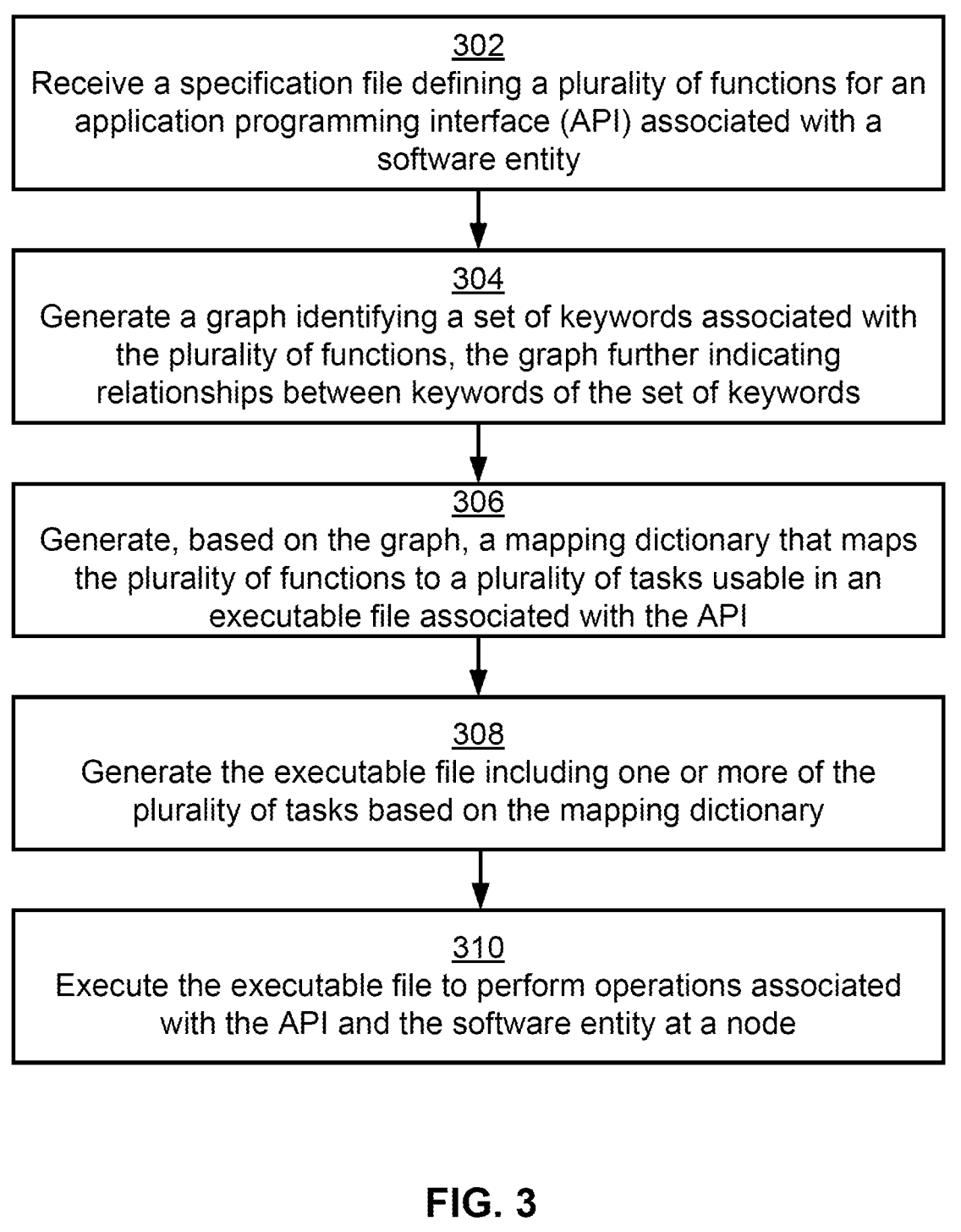

FIG. 3 is a flow chart of an example of a process for executing playbooks generated from specification files according to some examples of the present disclosure. In some examples, the processing device 203 can implement some or all of the steps shown in FIG. 3. Additionally, in some examples, the processing device 203 can be executing on or in communication with the control node 102 of FIG. 1 to implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIGS. 1-2.

At block 302, the processing device 203 can receive a specification file 210 defining a plurality of functions 212 for an API 209 associated with a software entity 211. The specification file 210 may be an OpenAPI specification that defines a schema for the API 209. The processing device 203 can monitor a repository 106 that stores specification files and detect when the specification file 210 is stored in the repository 106. Once the processing device 203 detects the specification file 210, the processing device 203 can access the specification file 210 from the repository 106.

At block 304, the processing device 203 can generate a graph 214 identifying a set of keywords 216 associated with the plurality of functions 212. The graph 214 can also indicate relationships 217 between keywords of the set of keywords 216. The graph 214 can be an AST generated from the set of keywords 216 and the relationships 217. The processing device 203 parses the specification file 210 to identify the keywords 216 and the relationships 217.

At block 306, the processing device 203 can generate, based on the graph 214, a mapping dictionary 218 that maps the plurality of functions 212 to a plurality of tasks 224 usable in an executable file 222 associated with the API 209. The plurality of functions 212 can be in a programming language associated with the specification file 210 and the plurality of tasks 224 can be in a programming language associated with the executable file 222, which can be different from the programming language of the specification file 210. So, the mapping dictionary 218 can associate the plurality of keywords 216 in the programming language of the specification file 210 with corresponding tasks for the plurality of tasks 224 in the programming language of the executable file. As an example, a POST function in an OpenAPI specification can be mapped to a create task in Python or a callback task in Java.

At block 308, the processing device 203 can generate the executable file 222 including one or more of the plurality of tasks 224 based on the mapping dictionary 218. The one or more of the plurality of tasks 224 can correspond to a function of the plurality of functions 212. So, the one or more of the plurality of tasks 224 included in the executable file 222 can correspond to a function included in the specification file 210. In some instances, an executable file can be generated for each function of the plurality of functions 212 based on the mapping dictionary 218. The executable file 222 may be an Ansible module.

At block 310, the processing device 203 can execute the executable file 222 to perform operations associated with the API 209 and the software entity 211 at a node 204. In the example, the software entity 211 can be deployed at the node 204 as a result of the processing device 203 executing the executable file 222. Additionally or alternatively, the API 209 can be deployed at the node 204 as a result of the processing device 203 executing the executable file 222. In some examples, the executable file 222 may be included in a configuration file 126 with additional executable files that are associated with other tasks of the plurality of tasks 224 corresponding to other functions of the plurality of functions 212. The executable files selected for inclusion in the configuration file 126 may be based on capacity parameters of the node 204 or based on an input indicating the functionality of the API 209 or the software entity 211 that the node 204 is to include. In this way, the configuration file can be customizable for a given node, which can improve performance of the API and the software entity at the node and reduce a likelihood of the node encountering errors.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:

a processing device; and a memory device storing program code that is executable by the processing device for causing the processing device to perform operations including:

receiving a specification file defining a plurality of functions for an application programming interface (API) associated with a software entity;

generating a graph identifying a set of keywords associated with the plurality of functions, the graph further indicating relationships between keywords of the set of keywords;

generating, based on the graph, a mapping dictionary that maps the plurality of functions to a plurality of tasks usable in an executable file associated with the API;

generating, based on the mapping dictionary, a set of executable files, wherein each executable file of the set of executable files corresponds to a function of the plurality of functions and includes a task of the plurality of tasks, the set of executable files including a first executable file including one or more of the plurality of tasks based on the mapping dictionary;

generating a configuration file including the set of executable files; and executing the configuration file to perform operations associated with the API and the software entity at a node, executing the configuration file involving executing the first executable file.

2. The system of claim 1, wherein the operations further comprise:

determining an update to the specification file indicating a removal of a first function of the plurality of functions; and generating an updated configuration file that excludes the executable file corresponding to the first function.

3. The system of claim 1, wherein the operations further comprise:

receiving an input indicating of a subset of the plurality of functions for inclusion in the configuration file;

selecting, from the set of executable files, a subset of the set of executable files corresponding to the subset of the plurality of functions; and generating the configuration file including the subset of the set of executable files.

4. The system of claim 1, wherein the operations further comprise:

receiving an input indicating of a set of capability parameters of the node;

selecting, from the set of executable files, a subset of the set of executable files based on the set of capability parameters; and generating the configuration file including the subset of the set of executable files.

5. The system of claim 1, wherein the operations further comprise:

determining an update to the specification file;

updating the graph and the mapping dictionary based on the update to the specification file; and generating an updated executable file based on the mapping dictionary; and executing the updated executable file to perform the operations associated with the API and the software entity at the node.

6. The system of claim 1, wherein the first executable file is associated with a first programming language, and wherein the operations further comprise:

generating a second executable file including an additional plurality of tasks associated with a second programming language.

7. A computer-implemented method comprising:

receiving, by a processing device, a specification file defining a plurality of functions for an application programming interface (API) associated with a software entity;

generating, by the processing device, a graph identifying a set of keywords associated with the plurality of functions, the graph further indicating relationships between keywords of the set of keywords;

generating, by the processing device and based on the graph, a mapping dictionary that maps the plurality of functions to a plurality of tasks usable in an executable file associated with the API;

generating, by the processing device and based on the mapping dictionary, a set of executable files, wherein each executable file of the set of executable files corresponds to a function of the plurality of functions and includes a task of the plurality of tasks, the set of executable files including a first executable file including one or more of the plurality of tasks based on the mapping dictionary;

generating, by the processing device, a configuration file including the set of executable files; and executing, by the processing device the configuration file to perform operations associated with the API and the software entity at a node, executing the configuration file involving executing the first executable file.

8. The computer-implemented method of claim 7, further comprising:

determining an update to the specification file indicating a removal of a first function of the plurality of functions; and generating an updated configuration file that excludes the executable file corresponding to the first function.

9. The computer-implemented method of claim 7, further comprising:

receiving an input indicating of a subset of the plurality of functions for inclusion in the configuration file;

selecting, from the set of executable files, a subset of the set of executable files corresponding to the subset of the plurality of functions; and generating the configuration file including the subset of the set of executable files.

10. The computer-implemented method of claim 7, further comprising:

receiving an input indicating of a set of capability parameters of the node;

selecting, from the set of executable files, a subset of the set of executable files based on the set of capability parameters; and generating the configuration file including the subset of the set of executable files.

11. The computer-implemented method of claim 7, further comprising:

determining an update to the specification file;

updating the graph and the mapping dictionary based on the update to the specification file; and generating an updated executable file based on the mapping dictionary; and executing the updated executable file to perform the operations associated with the API and the software entity at the node.

12. The computer-implemented method of claim 7, wherein the first executable file is associated with a first programming language, and wherein the method further comprises:

generating a second executable file including an additional plurality of tasks associated with a second programming language.

13. A non-transitory computer-readable medium comprising program code that is executable by a processor for causing the processor to perform operations including:

receiving a specification file defining a plurality of functions for an application programming interface (API) associated with a software entity;

generating a graph identifying a set of keywords associated with the plurality of functions, the graph further indicating relationships between keywords of the set of keywords;

generating, based on the graph, a mapping dictionary that maps the plurality of functions to a plurality of tasks usable in an executable file associated with the API;

generating, based on the mapping dictionary, a set of executable files, wherein each executable file of the set of executable files corresponds to a function of the plurality of functions and includes a task of the plurality of tasks, the set of executable files including a first executable file including one or more of the plurality of tasks based on the mapping dictionary;

generating a configuration file including the set of executable files; and executing the configuration file to perform operations associated with the API and the software entity at a node, executing the configuration file involving executing the first executable file.

14. The non-transitory computer-readable medium of claim 13, wherein the operations further comprise:

determining an update to the specification file indicating a removal of a first function of the plurality of functions; and generating an updated configuration file that excludes the executable file corresponding to the first function.

15. The non-transitory computer-readable medium of claim 13, wherein the operations further comprise:

receiving an input indicating of a subset of the plurality of functions for inclusion in the configuration file;

selecting, from the set of executable files, a subset of the set of executable files corresponding to the subset of the plurality of functions; and generating the configuration file including the subset of the set of executable files.

16. The non-transitory computer-readable medium of claim 13, wherein the operations further comprise:

receiving an input indicating of a set of capability parameters of the node;

selecting, from the set of executable files, a subset of the set of executable files based on the set of capability parameters; and generating the configuration file including the subset of the set of executable files.

17. The non-transitory computer-readable medium of claim 13, wherein the operations further comprise:

determining an update to the specification file;

updating the graph and the mapping dictionary based on the update to the specification file; and generating an updated executable file based on the mapping dictionary; and executing the updated executable file to perform the operations associated with the API and the software entity at the node.

* * * * *